United States Patent
Parks et al.

(10) Patent No.: US 11,548,511 B2
(45) Date of Patent: Jan. 10, 2023

(54) METHOD TO CONTROL VEHICLE SPEED TO CENTER OF A LANE CHANGE GAP

(71) Applicant: GM GLOBAL TECHNOLOGY OPERATIONS LLC, Detroit, MI (US)

(72) Inventors: Jeffrey S. Parks, Ann Arbor, MI (US); Paul A. Adam, Milford, MI (US); Gabriel T. Choi, Novi, MI (US); Braden J. Swantick, Canton, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 223 days.

(21) Appl. No.: 16/441,821

(22) Filed: Jun. 14, 2019

(65) Prior Publication Data

US 2020/0391746 A1    Dec. 17, 2020

(51) Int. Cl.
| | | |
|---|---|---|
| *B60W 30/18* | (2012.01) | |
| *B60W 30/12* | (2020.01) | |
| *B60W 50/00* | (2006.01) | |
| *G08G 1/16* | (2006.01) | |
| *B62D 15/02* | (2006.01) | |

(52) U.S. Cl.
CPC ...... *B60W 30/18163* (2013.01); *B60W 30/12* (2013.01); *B60W 50/0098* (2013.01); *B62D 15/0255* (2013.01); *G08G 1/167* (2013.01); *B60W 2050/0005* (2013.01); *B60W 2420/52* (2013.01); *B60W 2554/801* (2020.02)

(58) Field of Classification Search
CPC .......... B60W 30/18163; B60W 30/12; B60W 50/0098; B60W 2420/52; B60W 2554/801; B60W 2050/0005; B62D 15/0255; G08G 1/167

See application file for complete search history.

(56) References Cited

U.S. PATENT DOCUMENTS

| | | | |
|---|---|---|---|
| 2005/0256630 A1* | 11/2005 | Nishira | G08G 1/167 |
| | | | 701/96 |
| 2017/0123430 A1* | 5/2017 | Nath | B62D 15/0255 |
| 2017/0242435 A1* | 8/2017 | Nilsson | G05D 1/0088 |
| 2017/0248957 A1* | 8/2017 | Delp | B60W 10/18 |
| 2019/0004529 A1* | 1/2019 | Im | B62D 15/0255 |
| 2019/0126919 A1* | 5/2019 | Sundar Pal | B60W 30/0956 |
| 2019/0227550 A1* | 7/2019 | Yershov | G05D 1/0088 |
| 2019/0315348 A1* | 10/2019 | Mimura | G01C 21/3632 |
| 2019/0315360 A1* | 10/2019 | Kim | B60W 50/14 |
| 2019/0329777 A1* | 10/2019 | Rajab | B60W 60/00272 |
| 2019/0329778 A1* | 10/2019 | D'sa | B62D 15/0255 |
| 2019/0329779 A1* | 10/2019 | D'sa | B60W 60/00276 |

(Continued)

FOREIGN PATENT DOCUMENTS

WO    2014082698 A1    6/2014

*Primary Examiner* — Jeff A Burke
*Assistant Examiner* — Joshua Alexander Garza
(74) *Attorney, Agent, or Firm* — Cantor Colburn LLP

(57) ABSTRACT

A vehicle, system and method for operating the vehicle is disclose. The system includes a radar system and a processor. The radar system locates a gap between targets in a second lane adjoining a first lane, with the host vehicle residing in the first lane. The processor is configured to determine a viability value of the gap for a lane change, select the gap based on the viability value, align the host vehicle with the selected gap, and merge the host vehicle from the first lane into the selected gap in the second lane.

20 Claims, 5 Drawing Sheets

(56) References Cited

U.S. PATENT DOCUMENTS

| | | | |
|---|---|---|---|
| 2020/0062255 A1* | 2/2020 | Fernando | B60W 30/188 |
| 2020/0307589 A1* | 10/2020 | Li | B60W 30/16 |
| 2020/0331476 A1* | 10/2020 | Chen | G08G 1/167 |
| 2022/0185289 A1* | 6/2022 | Arora | B62D 15/0265 |

* cited by examiner

METHOD TO CONTROL VEHICLE SPEED TO CENTER OF A LANE CHANGE GAP

INTRODUCTION

The subject disclosure relates to autonomous and semi-autonomous vehicles and, in particular, to a system and method for navigating an autonomous or semi-autonomous vehicle in order to changes lanes in a flow of traffic.

Autonomous vehicles can be used to transport a person from one location to another. While on the road, it can be useful to change lanes in order to navigate traffic patterns. Currently, performing a lane change in an autonomous vehicle requires a driver to make a request or command for the lane change to the vehicle once the vehicle is next to an adequate gap for merging. This limits the vehicle's ability to change lanes to only those lane change requests made by the driver. Accordingly, it is desirable to provide a system and method for allowing an autonomous vehicle to recognize possible lane change opportunities and to thereby perform lane changes.

SUMMARY

In one exemplary embodiment, a method of operating a host vehicle is disclosed. A gap is determined between targets in a second lane adjoining a first lane, the host vehicle being located in the first lane. A viability value of the gap for a lane change is determined. The gap is selected based on the viability value. The host vehicle is aligned with the selected gap. The host vehicle merges from the first lane into the selected gap in the second lane.

In addition to one or more of the features described herein, the method further includes selecting the gap based on a comparison of the viability value to at least one threshold. Determining the viability value further includes determining at least one of an alignment time for aligning the host vehicle with the gap, a predicted a size of the gap at the alignment time, and a relative velocity between the host vehicle and the target vehicle. The method further includes predicting the size of a safe zone in the gap based on the predicted size of the gap at the alignment time and a length of a buffer zone. The method further includes determining the gap to be viable when the expected gap size is larger than a gap size threshold, the alignment time is less than a time threshold value, and a relative velocity between the host vehicle and the target vehicle is less than a relative velocity threshold. The method further includes locating a first gap and a second gap, determining a first viability value for the first gap and a second viability value for the second gap, and selecting one of the first gap and the second gap for merging based on a comparison of the first viability value and the second viability value. The method further includes controlling a speed of the host vehicle to move to a selected location with respect to one or more target vehicles and then match its speed to that of the one or more target vehicles.

In another exemplary embodiment, a system for operating a host vehicle is disclosed. The system includes a radar system and a processor. The radar system locates a gap between targets in a second lane adjoining a first lane, the host vehicle residing in the first lane. The processor is configured to determine a viability value of the gap for a lane change, select the gap based on the viability value, align the host vehicle with the selected gap, and merge the host vehicle from the first lane into the selected gap in the second lane.

In addition to one or more of the features described herein, the processor is further configured to select the gap based on a comparison of the viability value to at least one threshold. The processor is further configured to determine the viability value by determining at least one of an alignment time for aligning the host vehicle with the gap, a predicted a size of the gap at the alignment time, and a relative velocity between the host vehicle and the target vehicle. The processor is further configured to predict the size of a safe zone in the gap based on the predicted size of the gap at the alignment time and a length of a buffer zone. The processor is further configured to determine the gap to be viable when the expected gap size is larger than a gap size threshold, the alignment time is less than a time threshold value, and a relative velocity between the vehicle and the target vehicle is less than a relative velocity threshold. The processor is further configured to locate a first gap and a second gap, determine a first viability value for the first gap and a second viability value for the second gap, and select one of the first gap and the second gap for merging based on a comparison of the first viability value and the second viability value. The processor is further configured to control a speed of the host vehicle to move to a selected location with respect to one or more target vehicles and then match its speed to that of the one or more target vehicles.

In yet another exemplary embodiment, a vehicle is disclosed. The vehicle includes a radar system and a processor. The radar system locates a gap between targets in a second lane adjoining a first lane, the vehicle residing in the first lane. The processor is configured to: determine a viability value of the gap for a lane change, select the gap based on the viability value, align the vehicle with the selected gap, and merge the vehicle from the first lane into the selected gap in the second lane.

In addition to one or more of the features described herein, the processor is further configured to select the gap based on a comparison of the viability value to at least one threshold. The processor is further configured to determine the viability value by determining at least one of an alignment time for aligning the vehicle with the gap, a predicted a size of the gap at the alignment time, and a relative velocity between the vehicle and the target vehicle. The processor is further configured to predict the size of a safe zone in the gap based on the predicted size of the gap at the alignment time and a length of a buffer zone. The processor is further configured to determine the gap to be viable when the expected gap size is larger than a gap size threshold, the alignment time is less than a time threshold value, and a relative velocity between the vehicle and the target vehicle is less than a relative velocity threshold. The processor is further configured to locate a first gap and a second gap, determine a first viability value for the first gap and a second viability value for the second gap, and select one of the first gap and the second gap for merging based on a comparison of the first viability value and the second viability value.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
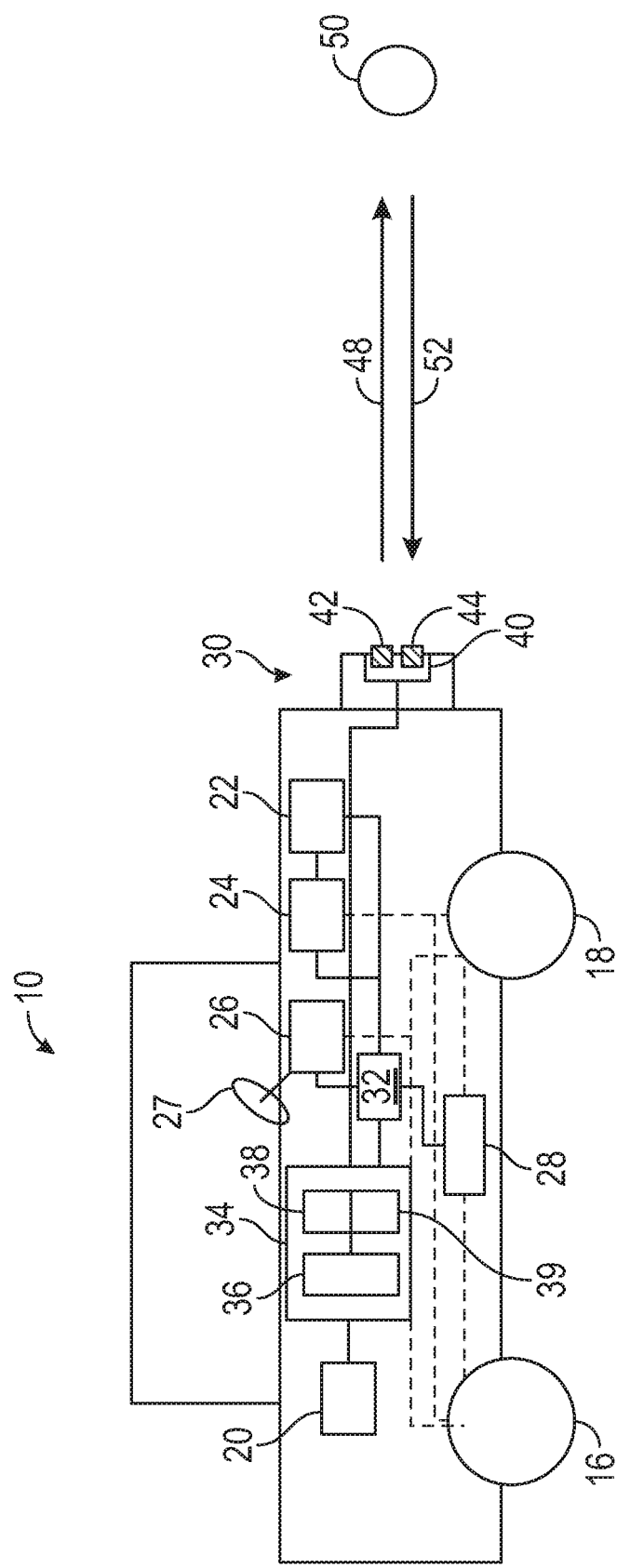
FIG. 1 shows an autonomous or semi-autonomous host vehicle in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a host vehicle 10. In an exemplary embodiment, the host vehicle 10 is a semi-autonomous or autonomous vehicle. In various embodiment, the host vehicle 10 includes at least one driver assistance system for both steering and acceleration/deceleration using information about the driving environment, such as cruise control and lane-centering. While the driver can disengaged from physically operating the vehicle by having his or her hands off the steering wheel and foot off pedal at the same time, the driver must be ready to take control of the vehicle.

The host vehicle 10 generally includes at least a navigation system 20, a propulsion system 22, a transmission system 24, a steering system 26, a brake system 28, a sensor system 30, an actuator system 32, and a controller 34. The navigation system 20 determines a trajectory plan for automated driving of the host vehicle 10. The propulsion system 22 provides power for creating a motive force for the host vehicle 10 and may, in various embodiments, include an internal combustion engine, an electric machine such as a traction motor, and/or a fuel cell propulsion system. The transmission system 24 is configured to transmit power from the propulsion system 22 to wheels 16 and 18 of the host vehicle 10 according to selectable speed ratios. The steering system 26 influences a position of the wheels 16 and 18. While depicted as including a steering wheel 27 for illustrative purposes, in some embodiments contemplated within the scope of the present disclosure, the steering system 26 may not include a steering wheel 27. The brake system 28 is configured to provide braking torque to the wheels 16 and 18.

The sensor system 30 includes a radar system 40 that senses targets in an exterior environment of the host vehicle 10 and provides various parameters of the targets. The radar system 40 includes a transmitter 42 and a receiver 44. In operation, the transmitter 42 of the radar system 40 sends out a radio frequency (RF) reference signal 48 that is reflected back at the host vehicle 10 by one or more targets 50 in the field of view of the radar system 40 as one or more reflected echo signals 52. The reference signal 48 can be a linear frequency modulates (LFM) or chirp signal that varies in frequency over a selected time duration. The one or more echo signals 52 can be used to determine various parameters of the one or more targets 50, such as a range of the target, Doppler frequency or relative radial velocity of the target, azimuth, elevation, etc. While shown in FIG. 1 as a forward-looking radar system 40, the radar system can also include transmitters and/or receivers capable of looking behind the host vehicle 10 or to any side of the host vehicle. Alternatively, multiple radar systems can be employed at the host vehicle 10 to provide backward-looking and side-looking awareness to the host vehicle in addition to the forward-looking radar system 40 shown in FIG. 1.

The actuator system 32 includes one or more actuators that control one or more vehicle features such as, but not limited to, the propulsion system 22, the transmission system 24, the steering system 26, and the brake system 28.

The controller 34 includes a processor 36 and a computer readable storage device or storage medium 38. The computer readable storage medium includes programs or instructions 39 that, when executed by the processor 36, operate the radar system 40 in order to obtain the various parameters of the target 50. The computer readable storage medium 38 may further include programs or instructions 39 that when executed by the processor 36, operate the navigation system 20 and/or the actuator system 32 according to the various parameters of the target 50 obtained by the radar system 40 in order to navigate the host vehicle 10 with respect to the target 50.

The navigation system 20 builds a trajectory for the host vehicle 10 based on data from the radar system 40 and any other parameters. The controller 34 can provide the trajectory to the actuator 32 to control the propulsion system 22, transmission system 24, steering system 26, and/or brake system 28 in order to navigate the host vehicle 10 with respect to the target 50.

In various embodiments, the processor 36 can identify gaps between vehicles in adjacent lanes based on parameters determined by the radar system 40 and perform various calculations for controlling the host vehicle 10 in order to merge into the identified gaps. Such calculations include, but are not limited to, calculating and controlling a speed of the host vehicle 10 in order to align the host vehicle with the gap, identifying safe zones within the gap, selecting a suitable gap from a plurality of possible gaps, etc. Details of the calculations performed at the processor 36 are discussed below.

Figure 2:
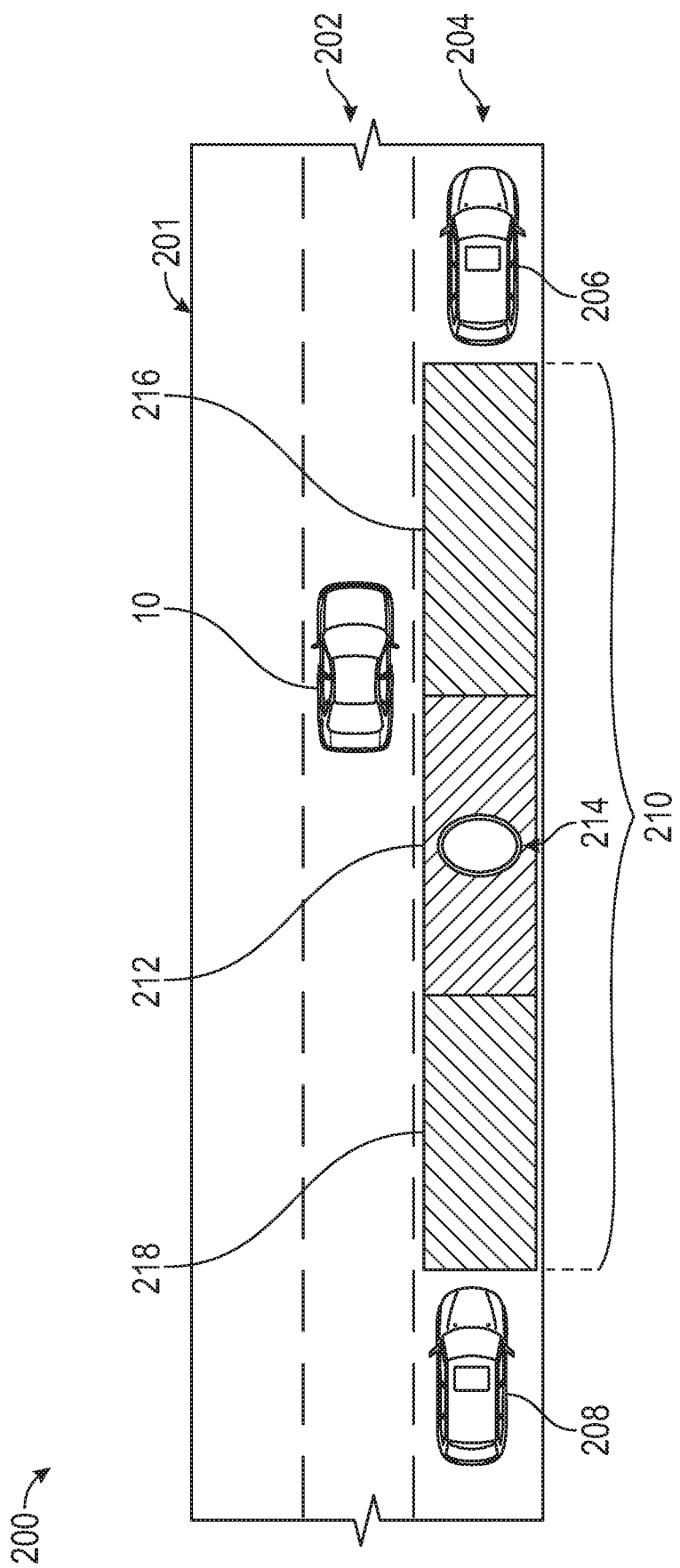
FIG. 2 shows a plan view of a road having a plurality of lanes, including a first lane and the second lane that adjoins the first lane.

FIG. 2 shows a plan view 200 of a road 201 having a plurality of lanes, including a first lane 202 and the second lane 204 that adjoins the first lane. As illustrated, the first lane 202 includes host vehicle 10 and the second lane 204 includes target vehicles 206 and 208. The host vehicle 10 has an intention of merging into the second lane 204, while the target vehicles 206 and 208 impose conditions on the host vehicle 10 for merging into the second lane. The first target vehicle 206 is in front of the second target vehicle 208 and the first target vehicle and second target vehicle are separated by a gap 210. As illustrated herein, the host vehicle merges to an adjacent lane to its right. It is to be understood however that the methods disclosed herein can also be used to merge the host vehicle into an adjacent lane on its left, as well as different merging configurations.

The gap 210 includes a front buffer zone 216 and a rear buffer zone 218, which are forbidden zones for the purposes of merging, generally for safety purposes. For example, if the host vehicle 10 finds itself in the front buffer zone 216 behind first target vehicle 206, the host vehicle does not have enough space to decelerate sufficiently in the event that the first target vehicle suddenly comes to a halt. The lengths of the front buffer zone 216 and the rear buffer zone 218 are determined by the velocities of the first target vehicle 206 and the second target vehicle 208. Additionally, depending on the relative positions of the first target vehicle 206 and the second target vehicle 208, the front buffer zone 216 and the rear buffer zone 218 can overlap each other, leading to there being no safe zone 212 between the first target vehicle and the second target vehicle. However, with sufficient distance between the first target vehicle 206 and the second target vehicle 208, the gap 210 can accommodate a safe zone 212 between the front buffer zone 216 and the rear buffer zone 218. When the length of the safe zone 212 is long enough the host vehicle 10 can merge into the safe zone.

The host vehicle 10 determines whether the gap 210 is of a suitable size for a safe merge prior to merging. For a safe merge of the host vehicle 10 into the gap 210, the host vehicle determines the size of gap (i.e., the length of the gap) and then determines the size or length of the safe zone 212. When the safe zone 212 is enough long, the host vehicle 10 can identify a mesh point 214 within the safe zone and perform calculations in order to merge safely into the safe zone 212 using the mesh point.

In order to merge from the first lane 202 to the second lane 204, the host vehicle 10 first locates one or more gaps in the second lane and then determines the viability of the one or more gaps. The viability for a gap can be a numerical value assigned to the gap that can be calculated based on various parameters, such as a size of the gap, a predicted time for the host vehicle 10 to reach the gap, and a projected size of the gap at the predicted time.

Figure 3:
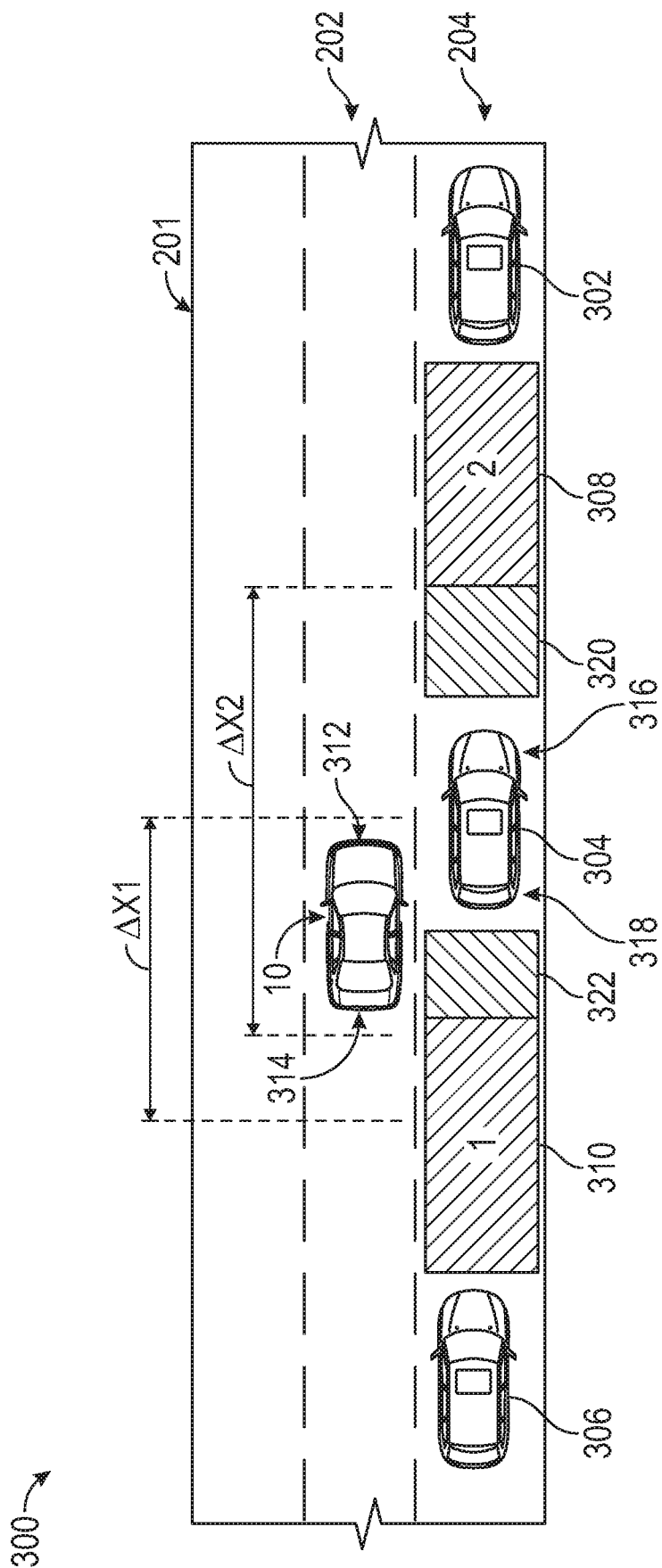
FIG. 3 shows a plan view of a road having multiple lane change opportunities.

FIG. 3 shows a plan view 300 of a road 201 having multiple lane change opportunities. FIG. 3 shows the host vehicle 10 in a first lane 202 adjacent a second lane 204 including a plurality of target vehicles, (i.e., first target vehicle 302, second target vehicle 304 and third target vehicle 306). A first gap 308 occurs between the first target vehicle 302 and the second target vehicle 304. A second gap 310 occurs between the second target vehicle 304 and the third target vehicle 306. The host vehicle 10 performs calculations in order to select one of the first gap 308 and the second gap 310 for merging based on a viability value computed for each of the first gap and second gap. The viability value depends on various calculated values, such as an expected time to reach the gap or align with the gap, a distance the host vehicle 10 has to travel to align with the gap, a predicted size of the gap once the host vehicle 10 has aligned with the gap, etc.

The time for which the host vehicle 10 takes to reach an identified safe zone is given by Eq. (1):

$$\text{Time to Gap} = \frac{\Delta x + \text{buffer}}{\Delta v_{x,obstacle} + \Delta v_{x,authority}} \quad \text{Eq. (1)}$$

where Δx is a either distance between a rear bumper 314 of the host vehicle 10 and a front bumper 316 of a target vehicle (in the case of moving ahead of the second target vehicle 304 into the first gap 308) or a distance between a front bumper 312 of the host vehicle and a rear bumper 318 of the target vehicle (in the case of moving behind the second target vehicle 304 into the second gap 310). Buffer is a length of the relevant forbidden zone (e.g., either the front bumper forbidden zone 320 of the second target vehicle 304 or the rear bumper forbidden zone 322 of the second target vehicle 304). The term $\Delta v_{x,threat}$ refers to the relative velocity between the host vehicle 10 and the relevant target vehicle (e.g., second target vehicle 304). The velocity of the target vehicle can be determined using the radar methods disclosed herein or any other suitable method. The value $\Delta v_{x,authority}$ is the relative velocity between the current speed of the host vehicle and a speed is allowable by the speed limit, vehicle, etc.

Once the time to reach the gap (Time to gap) has been determined, the distance that is to be travelled to reach the can be determined using Eq. (2):

$$x(\text{Time to Gap}) = x(t=0) + V_x*(\text{Time to Gap}) \quad \text{Eq. (2)}$$

where x(t=0) is the location of the host vehicle at time t=0, $V_x$ is the velocity of the host vehicle and (Time to Gap) is the time determined in Eq. (1). The predicted gap size at the time at which the host vehicle 10 is predicted to be aligned with the gap is shown in Eq. (3):

$$\text{Gap Size} = x_{front} - x_{rear} - \text{front buffer} - \text{rear buffer} - (v_{x,front} - v_{x,rear})(\text{Time to Gap}) \quad \text{Eq. (3)}$$

where $x_{front}$ is the location of the target vehicle in front of the gap (e.g., first target vehicle 206), $x_{rear}$ is the location of the target vehicle behind the gap (e.g., second target vehicle 208), front buffer is the length of the front buffer zone 216, rear buffer is the length of the rear buffer zone 218, $v_{x,front}$ is the velocity of the target vehicle in front of the gap and $v_{x,rear}$ is the velocity of the target vehicle behind the gap. The processor 36 can compute the size of the gap at the predicted time and thereby compute the size of the safe zone 212 within the gap.

The processor 36 computes the viability of the gap before commanding host vehicle 10 to align with the gap for a lane change. The viability is based on various calculations. For example, the gap is not viable if the time to reach the gap is a non-positive value. Also, the Time to Gap can be compared to a time threshold that is pre-determined for the vehicle. The gap is viable when the Time to Gap is less than this time threshold. The predicated gap size can be compared to a gap size threshold. The gap is viable when the predicted gap size is greater than the gap size threshold. The relative velocity of the host vehicle 10 with respect to a relevant target vehicle can be compared to a relative velocity threshold. The gap is viable with the relative velocity is less than the relative velocity threshold.

In various embodiments, the processor 36 considers the viability of a plurality of gaps and selects a gap from the plurality of gaps by comparing computed viability values for each gap. The viability value for a gap can be based on the Time to Gap, the predicated gap size and the relative velocity of the host vehicle with respect to a relevant target vehicle for the gap. The host vehicle 10 then proceeds to align with and merge into the gap having an optimal viability value.

Figure 4:
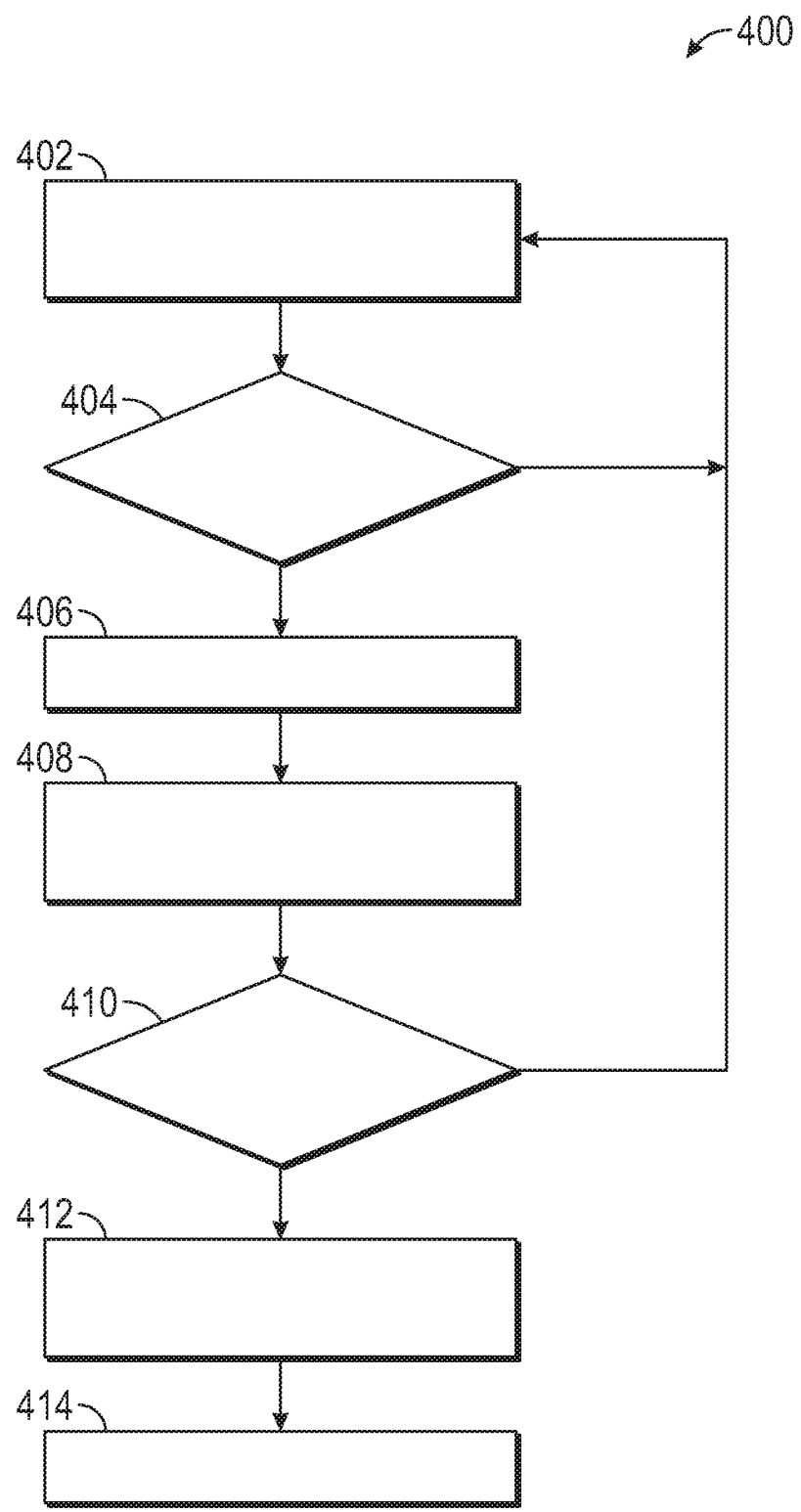
FIG. 4 shows flowchart illustrating a method for changing lanes for a vehicle as disclosed herein.

FIG. 4 shows flowchart 400 illustrating a method for changing lanes for a host vehicle as disclosed herein. The method starts at box 402 in which the driver initiates a lane change command (i.e., a lane change on demand) of the host vehicle 10. In box 404, the processor performs calculations in order to determine the gap size for a gap between various obstacles in the lane in to which the host vehicle intends to merge. If gap size is determined to be too small for the vehicle, the method returns to box 402. If the gap size is determined to be of sufficient size to accommodate the host vehicle 10, then the method continues on to box 406.

In box 406, the processor of the host vehicle calculates the time for the host vehicle to reach the gap. In box 408, a predicted gap size is calculated for the time at which the host vehicle is predicted to reach the gap. In box 410, the viability of the gap is determined using, for example, the methods disclosed herein. If the gap is considered to be non-viable (e.g., based on threshold comparisons), the method returns to box 402. If at box 410, the gap is considered to be viable, the method proceeds to box 412. In box 412, the processor 36 issues a command to the host vehicle 10 to align itself with the selected gap. Finally, in box 414, the host vehicle 10 executes the lane change in order to merge with the traffic in the adjacent lane.

Figure 5:
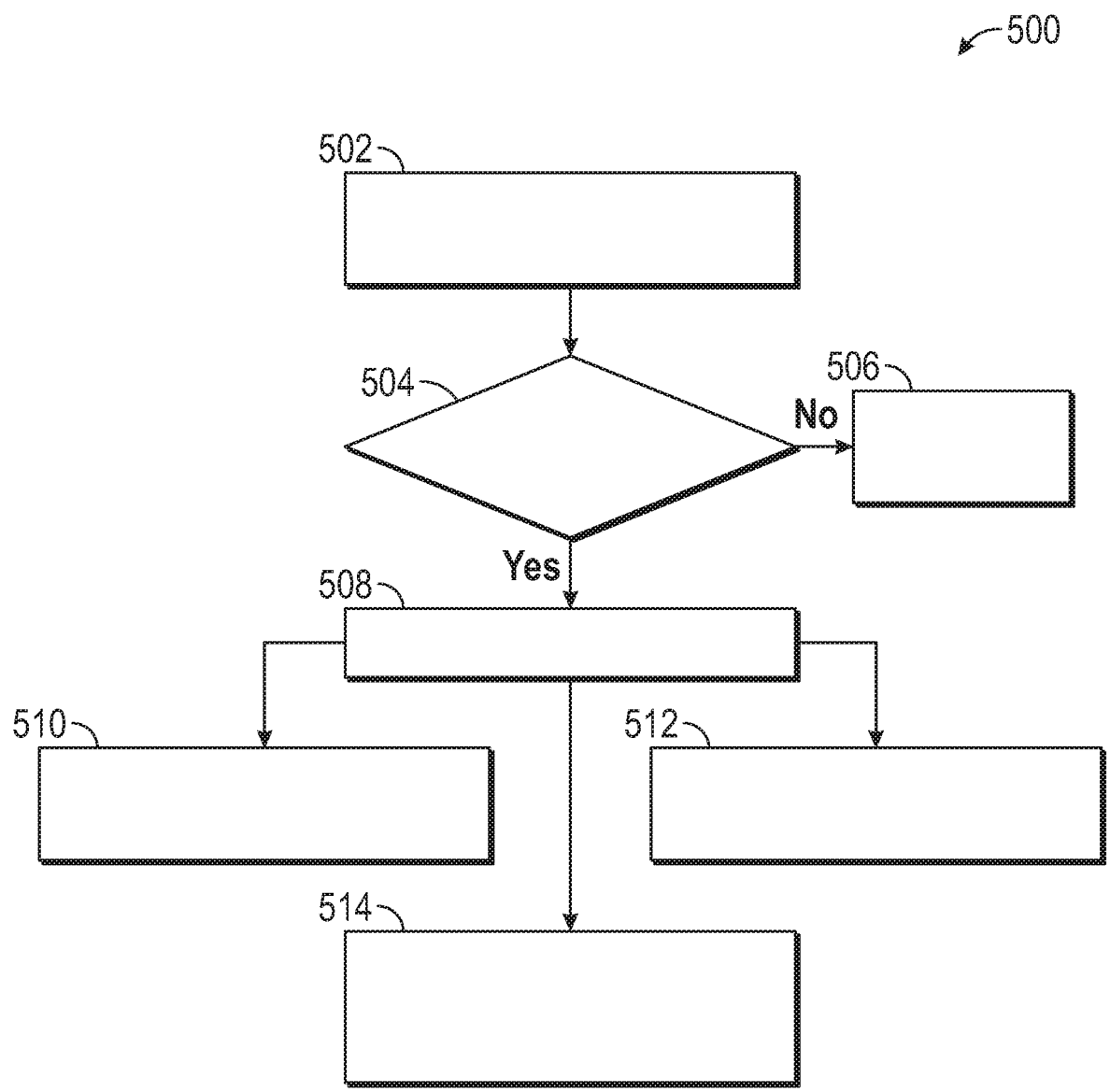
FIG. 5 shows a flowchart illustrating a method for selecting a gap for a lane change from amongst multiple available gaps.

FIG. 5 shows a flowchart 500 illustrating a method for selecting a gap for a lane change from amongst multiple available gaps. In box 502, an automated lane change is requested. In box 504, the processor 36 determines whether or not any target vehicles are present. If no target vehicles are located, then the method proceeds to box 506 in which the host vehicle changes lanes. If instead at box 504, target vehicles are determined to be present, the method proceeds to box 508. In box 508, the processor selected a gap for merging. If a plurality of gaps are viable, the processor selects the gap by a comparison of viability values calculated for each gap and selecting a gap having an optimal viability value.

If the gap is bounded only by a target vehicle located in front of the gap, then the method proceeds to box 510. In box 510, the host vehicle 10 controls its speed to move to a location behind the target vehicle and then match or substantially match its speed to that of the target vehicle. If the gap is bounded only by a target vehicle located behind the gap, then the method proceeds to box 512. In box 512, the host vehicle 10 controls its speed to move to a location ahead of the target vehicle and then match or substantially match its speed to that of the target vehicle. If the gap is bounded by a front target vehicle and a rear target vehicle, the method proceeds to box 514. In box 514, the host vehicle 10 locates a mesh point between the front target vehicle and the rear target vehicle and controls its speed to move to a location of the mesh point. The host vehicle can thereby controls its speed to move to a selected location with respect to the target vehicle and then match its speed to that of the target vehicle. In addition, the host vehicle can control its speed with respect to multiple target vehicles.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a host vehicle, comprising:
    determining, at the host vehicle located in a first lane, a first gap between a first target vehicle and a second target vehicle in a second lane adjoining the first lane and a second gap between the second target vehicle and a third target vehicle in the second lane;
    determining a first viability value for a lane change into the first gap based on a predicted size of a first safe zone in the first gap at a predicted alignment time for the first gap, wherein the predicted alignment time for the first gap is based on a first relative velocity between the host vehicle and the first target vehicle and a difference between a velocity of the host vehicle and a speed limit;
    determining a second viability value for a lane change into the second gap based on a predicted size of a second safe zone in the second gap at a predicted alignment time for the second gap, wherein the predicted alignment time for the second gap is based on a second relative velocity between the host vehicle and the second target vehicle and the difference between the velocity of the host vehicle and the speed limit;
    selecting one of the first gap and the second gap based on a comparison of the first viability value to the second viability value;
    aligning the host vehicle with the selected one of the first gap and the second gap; and
    merging the host vehicle from the first lane into the selected one of the first gap and the second gap.

2. The method of claim 1, further comprising determining at least one of: the first gap to be viable when the first viability value is greater than a viability threshold, and the second gap to be viable when the second viability value is greater than the viability threshold.

3. The method of claim 1, wherein determining the first viability value further comprises determining the alignment time for aligning the host vehicle with the first gap.

4. The method of claim 3, further comprising predicting the size of the safe zone in the first gap based on a difference between a velocity of the first target vehicle and a velocity of the second target vehicle.

5. The method of claim 3, further comprising determining the first gap to be viable when the expected size of the first gap is larger than a gap size threshold, the alignment time is less than a time threshold value, and the first relative velocity is less than a relative velocity threshold.

6. The method of claim 1, wherein comparing the first viability value to the second viability value further comprises determining which of the first viability value and the second viability value is an optimal viability value.

7. The method of claim 1, further comprising controlling a speed of the host vehicle to move to a selected location with respect to one or more target vehicles and then match its speed to that of the one or more target vehicles.

8. A system for operating a host vehicle, comprising:
    a radar system for locating a first gap between a first target vehicle and a second target vehicle in a second lane adjoining a first lane and a second gap between the second target vehicle and a third target vehicle in the second lane, the host vehicle residing in the first lane; and
    a processor configured to:
        determine a first viability value for a lane change into the first gap based on a predicted size of a first safe zone in the first gap at a predicted alignment time for the first gap, wherein the predicted alignment time for the first gap is based on a first relative velocity between the host vehicle and the first target vehicle and a difference between a velocity of the host vehicle and a speed limit;
        determine a second viability value for a lane change into the second gap based on a predicted size of a second safe zone in the second gap at a predicted alignment time for the second gap, wherein the predicted alignment time for the second gap is based on a second relative velocity between the host vehicle and the second target vehicle and the difference between the velocity of the host vehicle and the speed limit;
        select one of the first gap and the second gap based on a comparison of the first viability value to the second viability value;
        align the host vehicle with the selected one of the first gap and the second gap; and
        merge the host vehicle from the first lane into the selected one of the first gap and the second gap.

9. The system of claim 8, wherein the processor is further configured to determine at least one of: the first gap to be viable when the first viability value is greater than a viability threshold, and the second gap to be viable when the second viability value is greater than the viability threshold.

10. The system of claim 8, wherein the processor is further configured to determine the first viability value by determining an alignment time for aligning the host vehicle with the first gap.

11. The system of claim 10, wherein the processor is further configured to predict the size of the safe zone in the first gap based on a difference between a velocity of the first target vehicle and a velocity of the second target vehicle.

12. The system of claim 10, wherein the processor is further configured to determine the first gap to be viable when the expected size of the first gap is larger than a gap size threshold, the alignment time is less than a time threshold value, and the first relative velocity is less than a relative velocity threshold.

13. The system of claim 8, wherein the processor is further configured to compare the first viability value to the second viability value to determine which of the first viability value and the second viability value is an optimal viability value.

14. The system of claim 8, wherein the processor is further configured to control a speed of the host vehicle to move to a selected location with respect to one or more target vehicles and then match its speed to that of the one or more target vehicles.

15. A vehicle, comprising:
a radar system for locating a first gap between a first target vehicle and a second target vehicle in a second lane adjoining a first lane and a second gap between the second target vehicle and a third target vehicle in the second lane, the vehicle residing in the first lane; and
a processor configured to:
determine a first viability value for a lane change into the first gap based on a predicted size of a first safe zone in the first gap at a predicted alignment time for the first gap, wherein the predicted alignment time for the first gap is based on a first relative velocity between the host vehicle and the first target vehicle and a difference between a velocity of the host vehicle and a speed limit;
determine a second viability value for a lane change into the second gap based on a predicted size of a second safe zone in the second gap at a predicted alignment time for the second gap, wherein the predicted alignment time for the second gap is based on a second relative velocity between the host vehicle and the second target vehicle and the difference between the velocity of the host vehicle and the speed limit;
select one of the first gap and the second gap based on a comparison of the first viability value to the second viability value;
align the vehicle with the selected one of the first gap and the second gap; and
merge the vehicle from the first lane into the selected one of the first gap and the second gap.

16. The vehicle of claim 15, wherein the processor is further configured to determine at least one of: the first gap to be viable when the first viability value is greater than a viability threshold, and the second gap to be viable when the second viability value is greater than the viability threshold.

17. The vehicle of claim 15, wherein the processor is further configured to determine the first viability value by determining an alignment time for aligning the vehicle with the first gap.

18. The vehicle of claim 17, wherein the processor is further configured to predict the size of the safe zone in the first gap based on a difference between a velocity of the first target vehicle and a velocity of the second target vehicle.

19. The vehicle of claim 17, wherein the processor is further configured to determine the first gap to be viable when the expected size of the first gap is larger than a gap size threshold, the alignment time is less than a time threshold value, and the first relative velocity is less than a relative velocity threshold.

20. The vehicle of claim 15, wherein the processor is further configured to compare the first viability value to the second viability value to determine which of the first viability value and the second viability value is an optimal viability value.

* * * * *